United States Patent
Bar-on

(10) Patent No.: US 12,079,248 B2
(45) Date of Patent: Sep. 3, 2024

(54) ELECTRONIC MAIL COMMUNICATION SYSTEM HAVING A CENTRALIZED, DYNAMIC RULES LEDGER HAVING AGGREGATED RULE ENTRIES FOR A GROUP OF USERS

(71) Applicants: Atlassian Pty Ltd., Sydney (AU); Atlassian Inc., San Francisco, CA (US)

(72) Inventor: Noam Bar-on, San Francisco, CA (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 409 days.

(21) Appl. No.: 16/915,262

(22) Filed: Jun. 29, 2020

(65) Prior Publication Data
US 2021/0406287 A1    Dec. 30, 2021

(51) Int. Cl.
*G06F 16/28* (2019.01)
*H04L 51/42* (2022.01)

(52) U.S. Cl.
CPC ............ *G06F 16/287* (2019.01); *H04L 51/42* (2022.05)

(58) Field of Classification Search
CPC ................................ G06F 16/287; H04L 51/42
See application file for complete search history.

(56) References Cited

U.S. PATENT DOCUMENTS

| | | | |
|---|---|---|---|
| 2010/0017476 A1* | 1/2010 | Shue ..................... | G06Q 10/00 709/206 |
| 2016/0306812 A1* | 10/2016 | McHenry ............... | H04L 51/226 |
| 2016/0337300 A1* | 11/2016 | Ossia .................... | G06Q 10/107 |
| 2016/0380936 A1* | 12/2016 | Gunasekara .......... | H04L 51/212 709/206 |
| 2019/0296933 A1* | 9/2019 | Koul ..................... | G06F 13/107 |
| 2021/0216945 A1* | 7/2021 | Kapoor ............. | G06F 18/24155 |

OTHER PUBLICATIONS

Henricksen, Karen, and Jadwiga Indulska. "Personalising context-aware applications." OTM Confederated International Conferences "On the Move to Meaningful Internet Systems". Springer, Berlin, Heidelberg, 2005. (Year: 2005).*

* cited by examiner

*Primary Examiner* — Mohsen Almani
(74) *Attorney, Agent, or Firm* — Brownstein Hyatt Farber Schreck, LLP

(57) ABSTRACT

Electronic messages, such as email messages, may be classified according to classification rules by a client application operating on a client device. Messages may be classified according to whether and how they are to be displayed in various user interfaces of the client device. A centralized classification service may maintain a centralized and dynamic rules ledger having aggregated rule entries for a group of users. The centralized classification service may update the dynamic rules ledger based on receiving and aggregating user classification preferences received from client devices. The dynamic rules ledger may be used to automatically enable, disable, and/or edit classification rules on one or more client devices.

18 Claims, 9 Drawing Sheets

ELECTRONIC MAIL COMMUNICATION SYSTEM HAVING A CENTRALIZED, DYNAMIC RULES LEDGER HAVING AGGREGATED RULE ENTRIES FOR A GROUP OF USERS

TECHNICAL FIELD

Embodiments described herein relate to electronic messaging systems and, in particular, to systems and methods for classifying messages received by client devices and, additionally, to systems and methods for maintaining a dynamic rules ledger based on receiving and aggregating user classification preferences received from client devices.

BACKGROUND

Electronic messaging is leveraged for a wide variety of personal and professional purposes. Users of electronic messaging may set up automated processes that perform specified operations on received messages meeting certain criteria. Within an organization or group, users may use many of the same or similar automated processes for similar received messages. In conventional messaging systems, users are not privy to the automated processes that other users have in place, which leads to inefficiencies in establishing and maintaining these automated processes.

SUMMARY

Embodiments of the systems, devices, methods, and apparatuses described in the present disclosure are directed to classifying messages received by client devices and maintaining a dynamic rules ledger based on receiving and aggregating user classification preferences received from client devices.

One embodiment may take the form of an email communication system having a centralized classification service for aggregating user classification preferences across a set of client devices. The email communication system may include a first client device of a set of client devices that is operating a client application configured to receive an email message and classify the email message in accordance with a local classification rule of a first set of local classification rules on the first client device. Classifying the email message may include assigning the email message to a group of a set of groups. Each group of the set of groups may include a respective set of email messages received by the client device. The client application may be further configured to cause the email message to be displayed in a graphical user interface of a plurality of graphical user interfaces along with the set of email messages of the group. The client application may be further configured to receive a user classification preference with respect to the local classification rule and transmit the user classification preference to a centralized classification service. The centralized classification service may be configured to receive the user classification preference from the first client device and identify a global classification rule of a set of global classification rules stored by the centralized classification service and corresponding to the local classification rule. The centralized classification service may be further configured to increment or decrement an aggregated user preference weight associated with the global classification rule and, in response to the aggregated user preference weight exceeding a threshold value, modify the global classification rule. The centralized classification service may be further configured to transmit the modified classification rule to a second client device of the set of client devices and cause the modified classification rule to be incorporated into a second set of local classification rules on the second client device.

Another embodiment may take the form of a computer-implemented method for aggregating user classification preferences for an email system. The method may include the steps of receiving a user classification preference from a first client device regarding a local classification rule for classifying messages received by a client application executing on the client device and identifying a global classification rule of a set of global classification rules that corresponds to the local classification rule. The method may further include the steps of incrementing or decrementing an aggregated user preference weight associated with the global classification rule based on the user classification preference and determining whether the aggregated user preference weight exceeds a threshold value. The method may further include the step of, in response to the aggregated user preference weight exceeding the threshold value, modifying the global classification rule. The method may further include the steps of determining a set of default classification rules from the set of global classification rules and transmitting the set of default classification rules to a second client device.

Another embodiment may take the form of an email communication system that includes a first client device of a set of client devices and a centralized classification service. The first client device may operate a client application configured to receive an email message and classify the email message in accordance with a local classification rule of a first set of local classification rules. The client application may be further configured to receive a request to disable the local classification rule on the first client device and transmit a user classification preference indicating the request to disable the local classification rule to the centralized classification service. The centralized classification service may be configured to receive the user classification preference from the first client device and identify a global classification rule of a set of global classification rules stored by the centralized classification service that corresponds to the local classification rule. The centralized classification service may be further configured to increment a disable count associated with the global classification rule in response to the user classification preference indicating the request to disable the local classification rule and, in response to the disable count exceeding an inactive state threshold value, change a state of the global classification rule to inactive. The centralized classification service may be further configured to remove the global classification rule from a set of default classification rules in response to setting the state of the global classification rule to inactive. The centralized classification service may be further configured to transmit the set of default classification rules to a second client device of the set of client devices.

In addition to the example aspects and embodiments described above, further aspects and embodiments will become apparent by reference to the drawings and by study of the following description.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
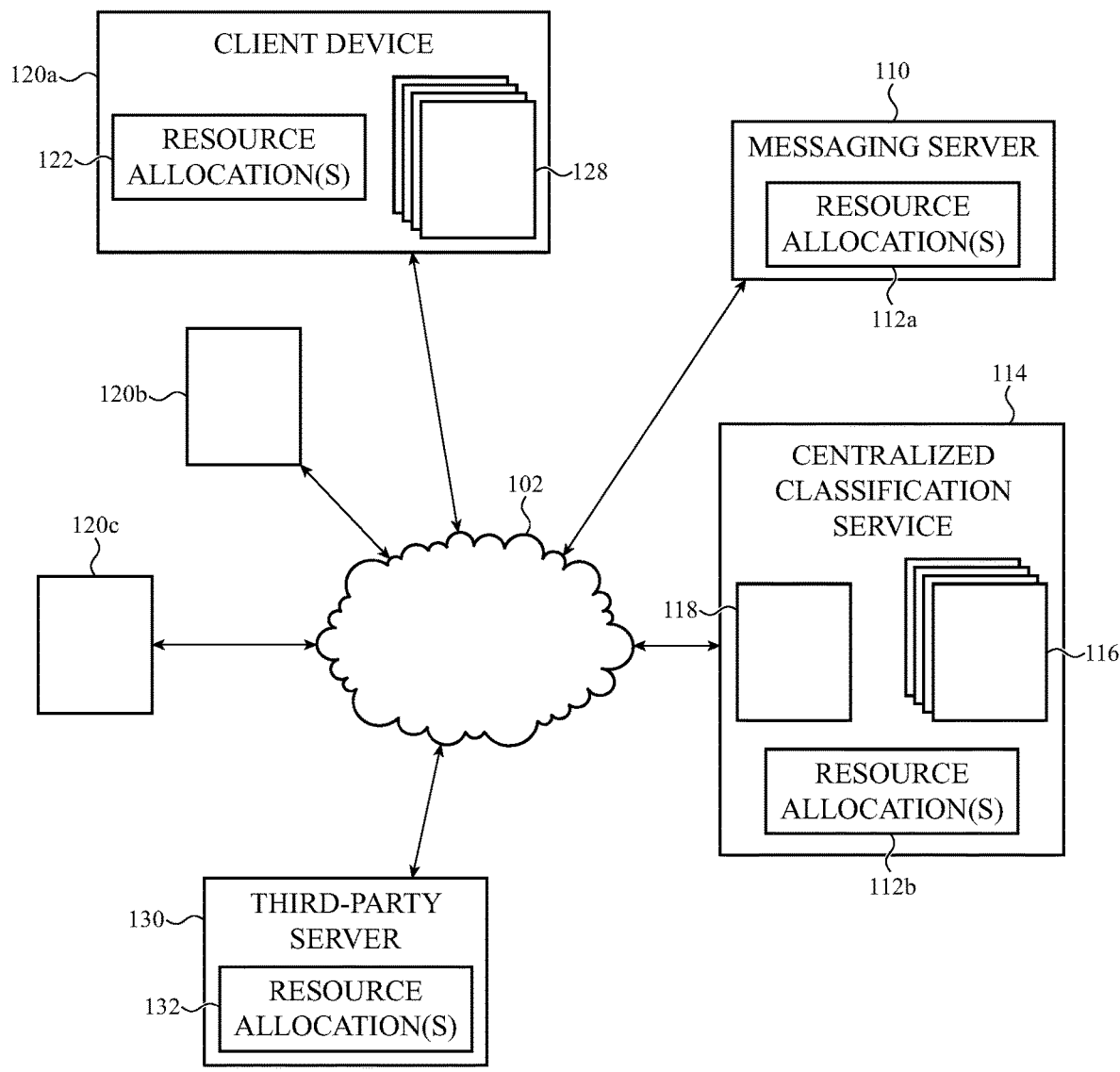
FIG. 1 depicts a system configured to transmit messages from senders to recipients.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems and methods for classifying electronic messages, such as email messages, according to classification rules, and maintaining a centralized and dynamic rules ledger having aggregated rule entries for a group of users.

Electronic messages, such as email messages, may be classified by a client application operating on a client device according to a set of local classification rules on the client device. Messages may be classified according to whether and how they are to be displayed in various user interfaces of the client device. A centralized classification service may maintain a centralized and dynamic rules ledger having aggregated rule entries for a group of users. The centralized classification service may update the dynamic rules ledger based on receiving and aggregating user classification preferences received from client devices. The dynamic rules ledger may be used to determine a set of default classification rules and/or to automatically enable, disable, and/or edit classification rules on one or more client devices.

Generally, users may control the classification rules that operate on their client device by providing user classification preferences regarding the classification rules. This allows users to control which messages are displayed in each of the various user interfaces of the client device. User classification preferences may include requests to enable classification rules so that they are applied to messages received at the client device and/or requests to disable classification rules so that they are not applied to messages received at the client device. Providing user classification preferences may additionally or alternatively include editing classification rules. Enabling classification rules may include creating a new classification rule, adding an existing classification rule from a rule repository or another source, or changing a classification rule to an enabled state. Disabling classification rules may include deleting a classification rule or changing a classification rule to an inactive state. Editing classification rules may include changing which messages a rule is applied to and/or changing how messages to which the rule is applied are classified.

Within an organization or group, many users may use the same or similar local classification rules to classify messages. A centralized classification service may maintain a centralized dynamic rules ledger for at least some of the classification rules used by a set of client devices, for example those of an organization or group. The centralized classification service may track and aggregate user classification preferences related to classification rules on the set of client devices. The aggregated user classification preferences may be used to determine a set of default classification rules for new or existing client devices within the organization or group and/or to automatically enable, disable, and/or edit classification rules on at least some client devices of the set of client devices. This may allow users to more easily enable classification rules that other users within their organization or group have enabled. Similarly, this may allow users to more easily edit or disable classification rules that other users within their organization or group have edited or disabled.

For each classification rule that is tracked by the centralized classification service, the centralized classification service may maintain a global classification rule. The global classification rule may have an associated aggregated user preference weight that represents the aggregated user classification preferences associated with the global classification rule. In response to receiving a user classification preference regarding a classification rule corresponding to the global classification rule, the aggregated user preference weight may be incremented or decremented. In response to the aggregated user preference weight exceeding a threshold value, the global classification rule may be modified.

Modifying the global classification rule may include editing the global classification rule or changing a state of the global classification rule. Once modified, the global classification rule may be transmitted to one or more client devices of the group of client devices, where it is incorporated into the local classification rules of the devices. Incorporating the global classification rule into the local classification rules of the devices may include modifying one or more local classification rules that correspond to the global classification rule in accordance with the modification to the global classification rule. Incorporating the global classification rule into the local classification rules of the devices may include adding or enabling one or more local classification rules that correspond to the global classification rule on one or more client devices. In some cases, a global classification rule is transmitted to a client device as part of set of default classification rules, for example as part of a setup operation of the client device.

Messages may be classified according to whether and how they are to be displayed in various user interfaces of the client device. Classifying an email message may include assigning the email message to one of a set of groups. Each group may be displayed in a different graphical user interface provided at the client device. Additionally or alternatively, email messages may be classified by assigning the email messages to either a group of messages that is displayed at the client device or a group of messages that is not displayed at the client device.

The embodiments described herein are described with respect to email messages, which may also be referred to as emails. An email is typically a file formatted according to, and/or otherwise compliant with, one or more protocols and is sent via the open Internet from a sender to a recipient. More specifically, an email, such as described herein originates at first client device that generates and sends that email to a sender server, also referred to herein as a "third-party server" or "SMTP server" that communicably couples with an "email host" server associated with an email provider, of which the recipient of the email is a subscriber. At a later time, a second client device operated by the recipient (herein, "end user" or "recipient") communicably couples to the email host and receives a copy of the email sent from the sender, which may also include metadata information such as message-identifying information and/or server identifying information. Such information, along with other email metadata included in the email received at the client device is referred to as "header" information.

Each client device operated by an end-user may include a processor and a memory. The processor can be configured to execute program code and/or instructions stored in the memory to instantiate an instance of an electronic mail client application that, in turn, is configured to communicably couple to, and exchange information with, an email host server and/or an SMTP server. In these examples, the electronic mail client application can receive and/or otherwise process email messages stored on the email host server. Once a message is received or otherwise obtained by the electronic mail client application from the email host server, it may be referred to as the "received email message."

Once the electronic mail client application of the client device receives the received email message from the email host server, one or more processing services, functions, modules, or modes of operation of the electronic mail client application can be triggered. One or more of these processes can be configured to classify the received email message using one or more classification rules.

The embodiments described herein are described with respect to email messages for purposes of providing examples, the embodiments described herein may be used with any type of electronic message from a wide variety of messaging protocols, including web-chat (e.g., a chat application of a web-page hosted), extensible messaging and presence protocol (XMPP), short message service (SMS) texting, multimedia messaging service (MMS), mobile chat (e.g., via an application installed on a client device, chat services provided by gaming consoles, and application program interfaces (APIs) that third party application can use to send messages, among others).

These foregoing and other embodiments are discussed below with reference to FIGS. 1-6. However, those skilled in the art will readily appreciate that the detailed description given herein with respect to these figures is for explanation only and should not be construed as limiting.

FIG. 1 depicts a system 100 configured to transmit messages from senders to recipients. Messages (e.g., emails) sent via the system 100 may be classified according to classification rules as described herein. In the illustrated example embodiment, the system 100 includes a messaging server 110 which is communicably coupled to a centralized classification service 114, one or more client devices 120a-c and one or more third-party servers 130. The system 100 also includes one or more networks 102 that enable communication between the various components of the system 100.

The third-party servers 130 can be further communicably coupled to one or more additional client devices (not shown), which the third-party servers 130 can send messages to and receive messages from. In this architecture, the system 100 may be a messaging system (e.g., an email communication system), and the client devices 120a-c and the other client devices (not shown) can be operated by senders and receivers of messages (e.g., emails). As one example, the messaging server 110 may be an email provider for users of the client devices 120a-c, and the third-party server 130 may be an email provider for users of client devices communicably coupled to the third party server.

In various embodiments, the messaging server 110 may be communicably coupled to the third-party server 130 via one or more email message sending communication protocols, such as the Simple Mail Transfer Protocol ("SMTP"). The messaging server 110 and the third-party server 130 may also be communicably coupled to the client devices 120a-c and the other client devices (not shown) via one or more email message receipt communication protocols, such as the Internet Message Access Protocol ("IMAP"), the Post Office Protocol (e.g., "POP3"), or other protocols, such as Microsoft's Exchange/ActiveSync protocol. The components of the system 100 may additionally or alternatively be communicably coupled to one another via other messaging protocols, including web-chat (e.g., a chat application of a web-page), extensible messaging and presence protocol (XMPP), short message service (SMS) texting, multimedia messaging service (MMS), mobile chat (e.g., via an application installed on a client device, chat services provided by gaming consoles, and application program interfaces (APIs) that third party application can use to send messages, among others).

It is appreciated that the foregoing embodiment depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

For example, each server or service of the system 100 of FIG. 1 can be implemented in a number of suitable ways. As illustrated, the messaging server 110, the centralized classification service 114, the third-party server 130 and the client devices 120a-c each include one or more purpose-configured components, which may be either software or hardware. In particular, it may be appreciated that although these functional elements are identified as separate and distinct devices (e.g., servers) that can each include allocations of physical or virtual resources (identified in the figure as the resource allocations 112a, 112b, 122, and 132 respectively), such as one or more processors, memory, and/or communication modules (e.g., network connections and the like), that such an implementation is not required. More generally, it may be appreciated that the various functions described herein can be performed by any suitable physical hardware, virtual machine, containerized machine, or any combination thereof.

Client device 120a is described in detail herein. The other client devices 120b and 120c may be the same as or similar to the client device 120a. The client device 120a may execute an instance of a messaging application (e.g., an email application) for sending and receiving messages (e.g., email messages). The client device 120a may classify messages received from the messaging server using a set of local classification rules 126 stored at the client device. As noted above, messages may be classified into groups according to whether and how they are to be displayed in various user interfaces of the client device 120a, as discussed in more detail below with respect to FIGS. 2A-2D. A user of the client device 120a may control the classification rules of the set of local classification rules 126 that operate on the client device by providing user classification preferences regarding the classification rules. This allows the user to control which messages are displayed in each of the various user interfaces of the client device 120a.

Providing user classification preferences may include enabling classification rules so that they are applied to messages received at the client device 120a and/or disabling classification rules so that they are not applied to messages received at the client device. Providing user classification preferences may additionally or alternatively include editing classification rules. Enabling classification rules may include creating a new classification rule, adding an existing classification rule from a rule repository or another source, or changing a classification rule to an enabled state. Disabling classification rules may include deleting a classification rule or changing a classification rule to an inactive state. Editing classification rules may include changing which messages a rule is applied to and/or changing how messages to which the rule is applied are classified.

The system 100 may include a centralized classification service 114 that maintains a centralized dynamic rules ledger 118 for a set of global classification rules that correspond to at least some of the classification rules used by a set of client devices (e.g., client devices 120a-c). The centralized classification service may track and aggregate user classification preferences related to classification rules on the set of client devices 120a-c. In addition to users of the client devices 120a-c being able to control classification rules operating on their device, the aggregated user classification preferences may be used to automatically enable, disable, and/or edit classification rules on at least some client devices of the set of client devices 120a-c. In FIG. 1, the centralized classification service 114 is shown separately from the messaging server 110. In some cases, the centralized classification service 114 is integrated with, or otherwise operates in conjunction with, the messaging server 110.

In some cases, each local classification rule on a set of client devices 120a-c has a corresponding global classification rule maintained by the centralized classification service 114. A single global classification rule maintained by the centralized classification service 114 may correspond to multiple identical local classification rules on multiple client devices 120a-c. In this way, user classification preferences provided for the identical local classification rules may be aggregated by the centralized classification service 114. The aggregated user classification preferences may be used to modify the global classification rules. Modifying a global classification rule may include editing the global classification rule or changing a state of the global classification rule.

The dynamic rules ledger 118 maintained by the centralized classification service 114 may include a state for each global classification rule. The states of global classification rules may include an active state, an inactive state, and/or a recommended state. The state of a particular global classification rule may be modified in response to aggregated user classification preferences. A global classification rule may be in the active state in response to the aggregated user classification preferences regarding the global classification rule indicating generally positive treatment of the global classification rule (e.g., more users adding or keeping the rule than removing the rule). A global classification rule may be in the inactive state in response to the aggregated user classification preferences regarding the global classification rule indicating generally negative treatment of the global classification rule (e.g., more users removing the rule than adding or keeping the rule). The inactive state may also be the initial state for newly created rules. A global classification rule may be in the recommended state in response to the aggregated user classification preferences regarding the global classification rule indicating both positive and negative treatment of the global classification rule (e.g., users adding or keeping the rule and users removing the rule).

The rules ledger 118 may include one or more associated aggregated user preference weights for each global classification rule that represents the aggregated user classification preferences associated with the global classification rule. These aggregated user preference weights may be used to transition the global classification rule between states, as described in more detail below with respect to FIG. 5. In response to receiving a user classification preference regarding a classification rule, the centralized classification service 114 may identify a global classification rule of the set of global classification rules 116 that corresponds to the classification rule. The centralized classification service 114 may increment or decrement one or more aggregated user preference weights corresponding to the global classification rule. In response to the centralized classification service 114 determining that an aggregated user preference weight exceeds a threshold, the centralized classification service may modify the global classification rule.

In some cases, the aggregated user preference weights include an enable count that is incremented each time a user enables the classification rule, a disable count that is incremented each time a user disables the classification rule, an absolute count that is incremented each time a user enables the classification rule and decremented each time a user disables the classification rule, and a cycle count that is incremented each time the classification rule completes a cycle of being enabled a predetermined number of times (e.g., 5 times) and disabled a predetermined number of times (e.g., 3 times). In some cases, the cycle count may be incremented each time the classification rule transitions from the active state to the inactive state, or vice versa.

The state of a global classification rule may be changed from inactive to active if the enable count meets or exceeds an active state threshold value (e.g., 5). The state of a global classification rule may be changed from active to inactive if the disable count meets or exceeds an inactive state threshold value (e.g., 3). The state of a global classification rule may be changed to recommended if the cycle count meets or exceeds a recommendation threshold value (e.g., 4). The threshold values may differ from one another. In some cases, the enable count and the disable count reset to zero each time the state of the global classification rule changes.

The aggregated user preference weights may include one or more edit counts. An edit count may correspond to a particular change to a classification rule, and may be incremented each time that particular change is made. If the edit count meets or exceeds an edit threshold, the global classification rule may be edited to reflect the change associated with the edit count.

The centralized classification service 114 may transmit global classification rules to one or more client devices 120a-c of the group of client devices. At least some of the global classification rules maintained by the centralized classification service 114 may be provided, for example, to a client device during a setup process of a client application.

In this manner, the global classification rules transmitted to the client devices may be used to establish a set of local classification rules.

The centralized classification service 114 may determine a set of default global classification rules that should be sent to client devices during setup to establish a set of local classification rules. Global classification rules in the active state may be included in the d set of default f global classification rules. Global classification rules in the inactive state may not be included in the set of default global classification rules. Global classification rules in the recommended state may not be included in the set of default global classification rules, but may be suggested to users as part of a setup process.

In other embodiments, global classification rules may be provided to client devices that are already set up, and the global classification rules may be integrated with an existing set of local classification rules. Determining whether to transmit a global classification rule to a client device 120a-c may be based on a state of the global classification rule determined by the centralized classification service 114. The centralized classification service may transmit a global classification rule to one or more client devices if the state of a global classification rule changes from inactive to active and/or from inactive to recommended. Additionally or alternatively, the centralized classification service may transmit a global classification rule to one or more client devices if the global classification rule is edited, for example in response to an edit count reaching or exceeding an edit threshold.

Additionally or alternatively, deciding whether to transmit a global classification rule to a client device 120a-c may be based on one or more conditions or settings of the client device. For example, a user of a client device 120a-c may specify that they do or do not want to receive global classification rules from the centralized classification service. In some cases, global classification rules are only transmitted to client devices as part of a setup process.

In some cases, global classification rules provided to client devices may conflict with local classification rules on the client device 120a-c. Classification rules conflict with one another when they perform inconsistent operations on the same messages. For example, if a first classification rule assigns a message to a first group and a second classification rule assigns the same message to a second group, the classification rules conflict with one another.

The client device 120a-c may determine whether a received classification rule conflicts with one or more local classification rules on the client device. The client device 120a-c may incorporate the received classification rule into a set of local classification rules (e.g., add the received classification rule to the set of local classification rules) if the rule does not conflict with any local classification rules on the client device. If there is a conflicting local classification rule the client device 120a-c may determine whether to incorporate the global classification rule into the set of local classification rules (e.g., replace the local classification rule with the global classification rule). In some cases, if the local classification rule was created or has been modified (e.g., enabled, disabled, or edited) by the user of the client device, the local classification rule is not replaced by the global classification rule. If the local classification rule was not created or has not been modified (e.g., enabled, disabled, or edited) by the user of the client device, the local classification rule is replaced by the global classification rule.

In some cases, global classification rules may conflict with one another. Different users may have different local classification rules that classify messages having particular message characteristics differently. For example, a first user may wish to classify messages from a sender having a subject as notifications, while a second user may wish to classify messages from the same sender and having the same subject as tasks. This may require additional analysis by the centralized classification service 114 to determine a set of default global classification rules (or to otherwise determine rules to transmit to client devices), an example of which is described below with respect to FIG. 6. The centralized classification service 114 may be configured to determine a set of default global classification rule by choosing between two or more global classification rules that conflict with one another. Choosing between two or more global classification rules that conflict with one another may include comparing states of the two or more global classification rules. Additionally or alternatively, choosing between two or more global classification rules that conflict with one another may include comparing aggregated user preference weights associated with the two or more global classification rules.

As noted above, the client devices (e.g., client device 120a) may classify messages according to classification rules. An instance of a messaging application operating on the client device 120a may maintain the set of local classification rules 126 on the client device, and may apply enabled classification rules to incoming messages to classify the messages. Messages may be classified based on message characteristics, including a sender of the message, one or more recipients of the message, content of the message, including a message subject and/or message body, message identifiers, such as header information. The instance of the messaging application operating on the client device 120a may analyze incoming messages to determine whether the message characteristics trigger the application of one or more classification rules. Classifying messages may include assigning the messages to different groups that are displayed in different user interfaces. Classifying messages may further include performing any operations related to the messages, moving, saving, or deleting the messages, automatically forwarding or replying to messages, determining a notification type for the messages, and the like.

FIGS. 2A-2D depict an example client device 220 executing an instance of a messaging application (e.g., an email client application) configured to classify messages, such as described herein. The client device 220 includes a housing 228 that encloses and supports a display 240. The display 240 can be leveraged by the instance of the messaging application to generate graphical user interfaces. Although each of these figures illustrates the example client device 220 as a desktop computer, it may be appreciated that this is merely one example. In other configurations and/or architectures, other electronic devices can be used including mobile devices, tablet devices, and wearable devices.

The messaging application (or, more simply, a client application) can be defined by executable code or instructions stored in a persistent memory of the client device 220. A processor of the client device 220 can be communicably coupled to the persistent memory and can access the persistent memory to load at least a portion of the executable code or instructions into a working memory in order to instantiate the messaging application. For simplicity of description, an instantiated messaging application is referred to herein, simply as a messaging application. For simplicity of illustration, the client device 220 is depicted without a processor, a working memory, or a persistent memory; it may be appreciated however that such components (also referred to as resource allocations with reference to FIG. 1) may be included within the housing 228 or in another location.

The graphical user interfaces rendered by the client application are configured to present information related to messages received by a user of the client device 220. The graphical user interfaces may present messages in different ways based on how the messages are classified according to classification rules. In some cases, messages may be classified into one or more groups, and each group is displayed in a different user interface. Classifying a message may include assigning the message to a group of a set of groups. Each group of the set of groups may include a set of email messages, and each group's set of email messages may be displayed in a separate graphical user interface. In some cases, each message may only be assigned to a single group. That is, the groups are mutually exclusive or disjoint. In some cases, each message may be assigned to one group or more than one group.

In one example embodiment shown in FIGS. 2A-2D, the groups may include communications, notifications, tasks, and questions. Messages may also be classified such that they are not displayed in any of the graphical user interfaces rendered by the client application. The graphical user interfaces rendered by the client application may present the messages in each group in a manner that is appropriate for the group.

The client application may extract relevant information from the messages to present in the graphical user interface. Different information may be extracted from messages classified in different groups. Similarly, the information extracted from messages may be formatted or otherwise presented differently in the different graphical user interfaces. For example, for messages classified as communications, the client application may extract a sender and/or a subject from a message for display in the graphical user interface. As another example, for a message classified as a question, the client application may extract a question and/or one or more answers from the message for display in the graphical user interface.

Figure 2A:
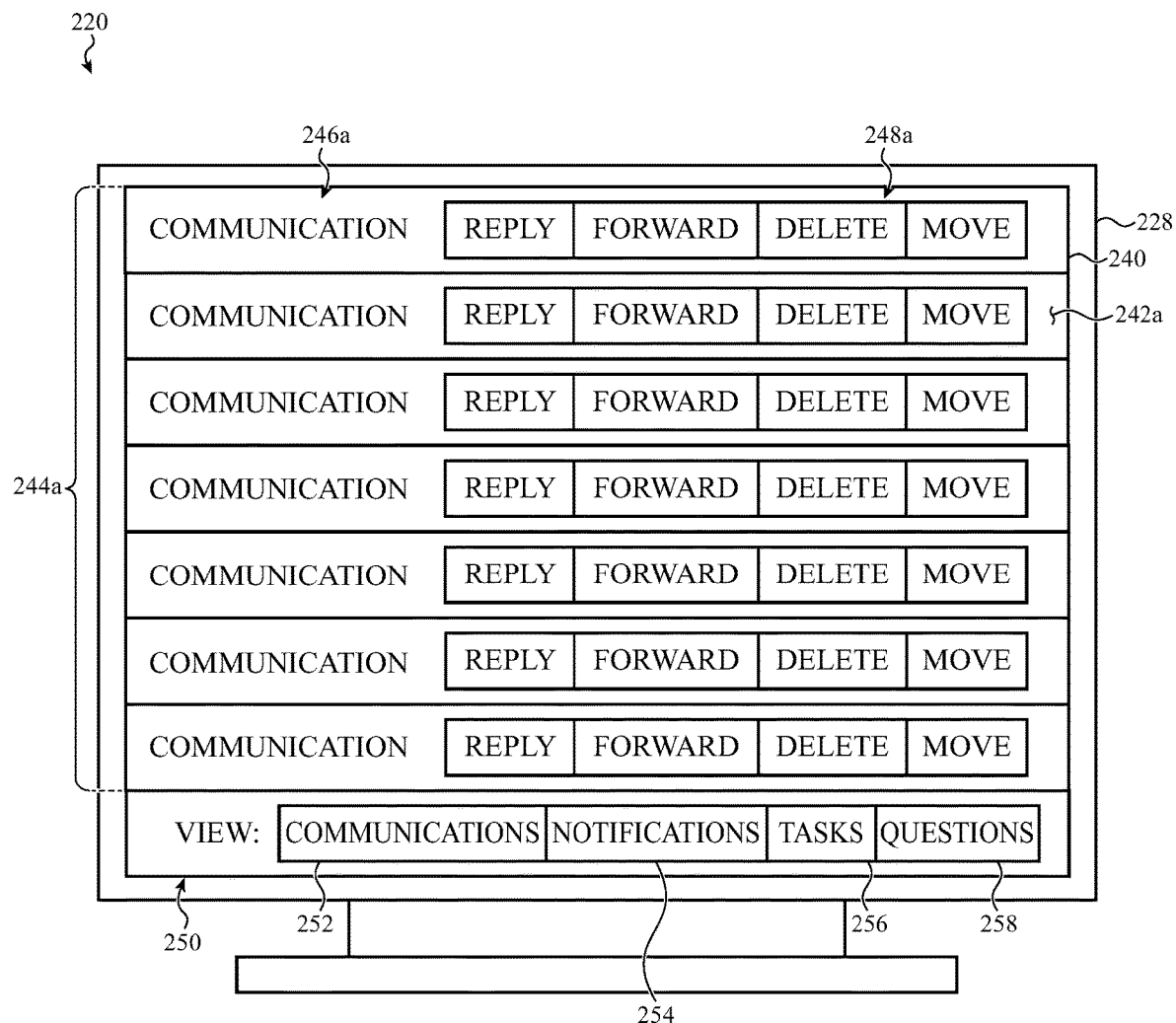
FIGS. 2A-2D depict an example client device executing an instance of a messaging application (e.g., an email client application) configured to classify messages, such as described herein.

For example, as shown in FIG. 2A, a graphical user interface 242a can present a communication list 244a that includes messages that are classified as communications. The graphical user interface 242a may be similar to a traditional email inbox. The communication list 244a can display condensed information about messages that are classified as communications. The communication list 244a may include elements 246a for each message. The element 246a may be or include text or other data extracted from the message (e.g., from an email header, subject, or body). For example, the element 246a may include information about the message that is typical of an email inbox, such as a subject, a sender, and/or at least part of the body text of a message.

The actionable buttons 248a can be leveraged by the user to instruct the client application to perform one or more actions, including replying to a communication, forwarding a communication, deleting a communication, moving a communication, and the like. The graphical user interface 242a may include a view selector 250 that allows the user to view different groups of messages into which the messages are classified. In FIG. 2A, the communications button 252 is selected, so the group of messages that are classified as communications is displayed. Messages may be classified as communications if the message is or will likely be part of a larger conversation between the sender, the recipient, or other parties.

Figure 2B:
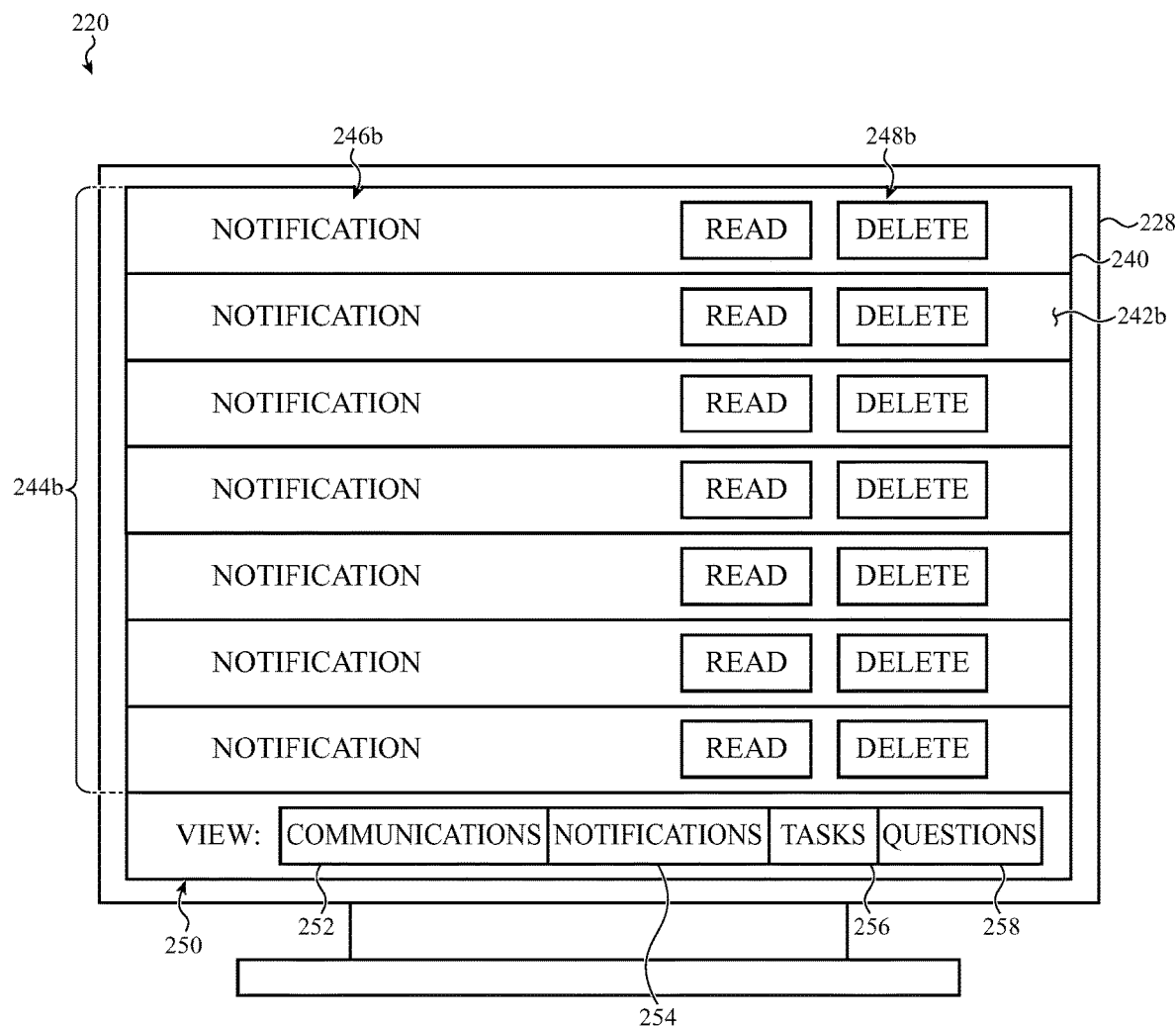

In FIG. 2B, the notifications button 254 is selected, and a group of messages that are classified as notifications is displayed in a graphical user interface 242b. The graphical user interface 242b can present a notifications list 244b that includes messages that are classified as notifications. The notifications list 244b can display condensed information about messages that are classified as notifications. The notifications list 244b may include elements 246b for each message. The element 246b may be or include text or other data extracted from the message (e.g., from an email header, subject, or body). For example, the element 246b may include information suitable for providing a notification to a user. In some cases, this may include processing an email made from a template (e.g., a form email or standardized email) to extract information that is unique (e.g., information that is not contained in the template). As noted above, the information extracted from messages for display using the elements 246b may be different information and/or may be formatted or otherwise presented differently than the information extracted from messages for display using the elements 246a of the graphical user interface 242a.

The actionable buttons 248b can be leveraged by the user to instruct the client application to perform one or more actions, including marking a notification as read, deleting a notification, and the like. The graphical user interface 242b may include the view selector 250. Messages may be classified as notifications if it is unlikely that a user will reply to the message. In some cases, messages received from an automated sending service, such as a collaboration service sending a progress update, may be classified as notifications.

Figure 2C:
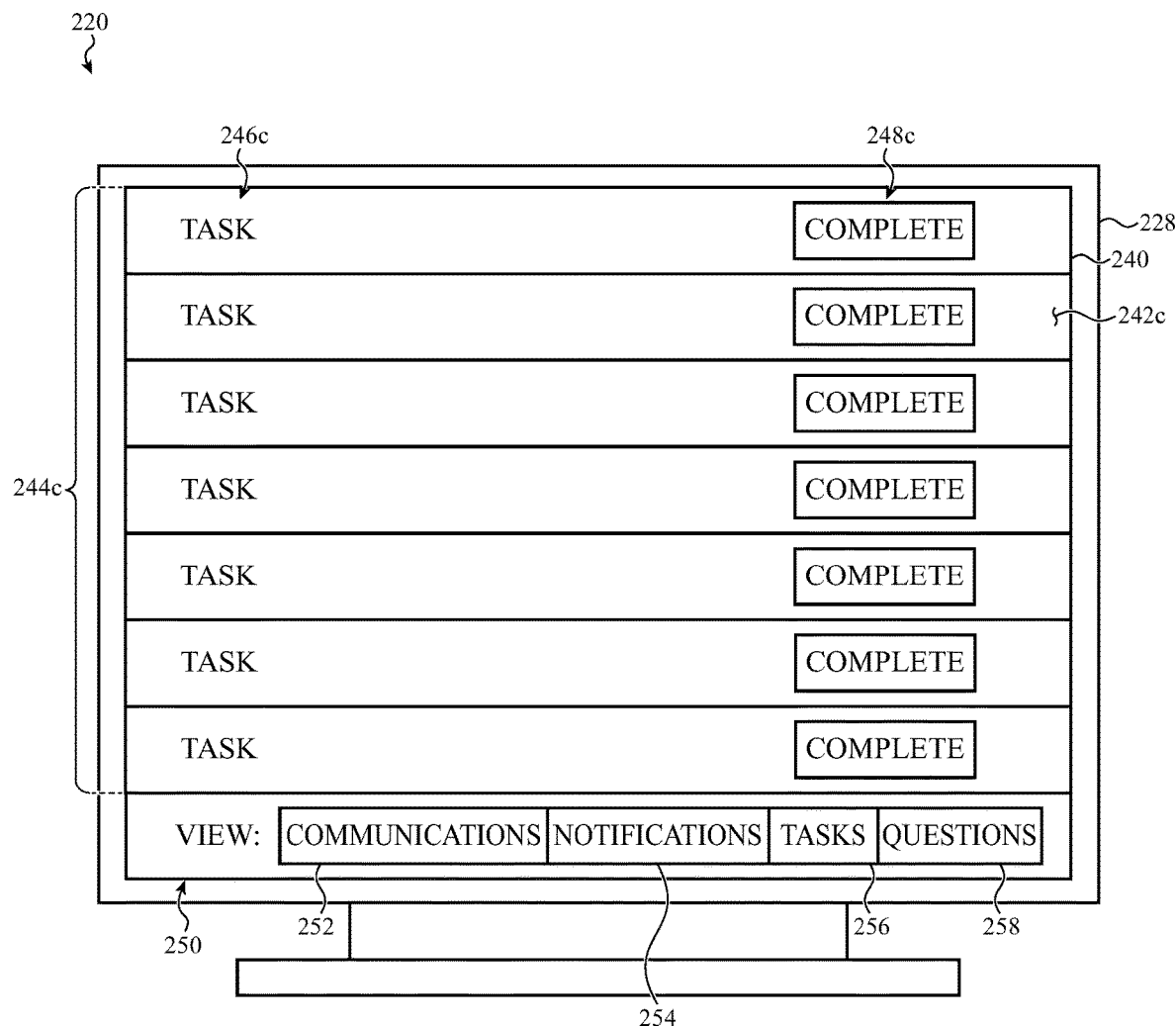

In FIG. 2C, the tasks button 256 is selected, and a group of messages that are classified as tasks is displayed in a graphical user interface 242c. The graphical user interface 242c can present a task list 244c that includes messages that are classified as tasks. The task list 244c can display condensed information about messages that are classified as tasks. The task list 244c may include elements 246c for each message. The element 246c may be or include text or other data extracted from the message (e.g., from an email header, subject, or body). For example, the element 246c may include information suitable for presenting a task to a user. In some cases, this may include processing an email made from a template (e.g., a form email or standardized email) to extract information that is unique (e.g., information that is not contained in the template). As noted above, the information extracted from messages for display using the elements 246c may be different information and/or may be formatted or otherwise presented differently than the information extracted from messages for display using the elements 246a, 246b of the graphical user interfaces 242a, 242b, respectively.

The actionable buttons 248c can be leveraged by the user to instruct the client application to perform one or more actions, including marking a task complete, and the like. The graphical user interface 242c may include the view selector 250. Messages may be classified as tasks if the message assigns some duty to the user. In some cases, messages received from a collaboration service that assign users to projects or other duties may be classified as tasks.

Figure 2D:
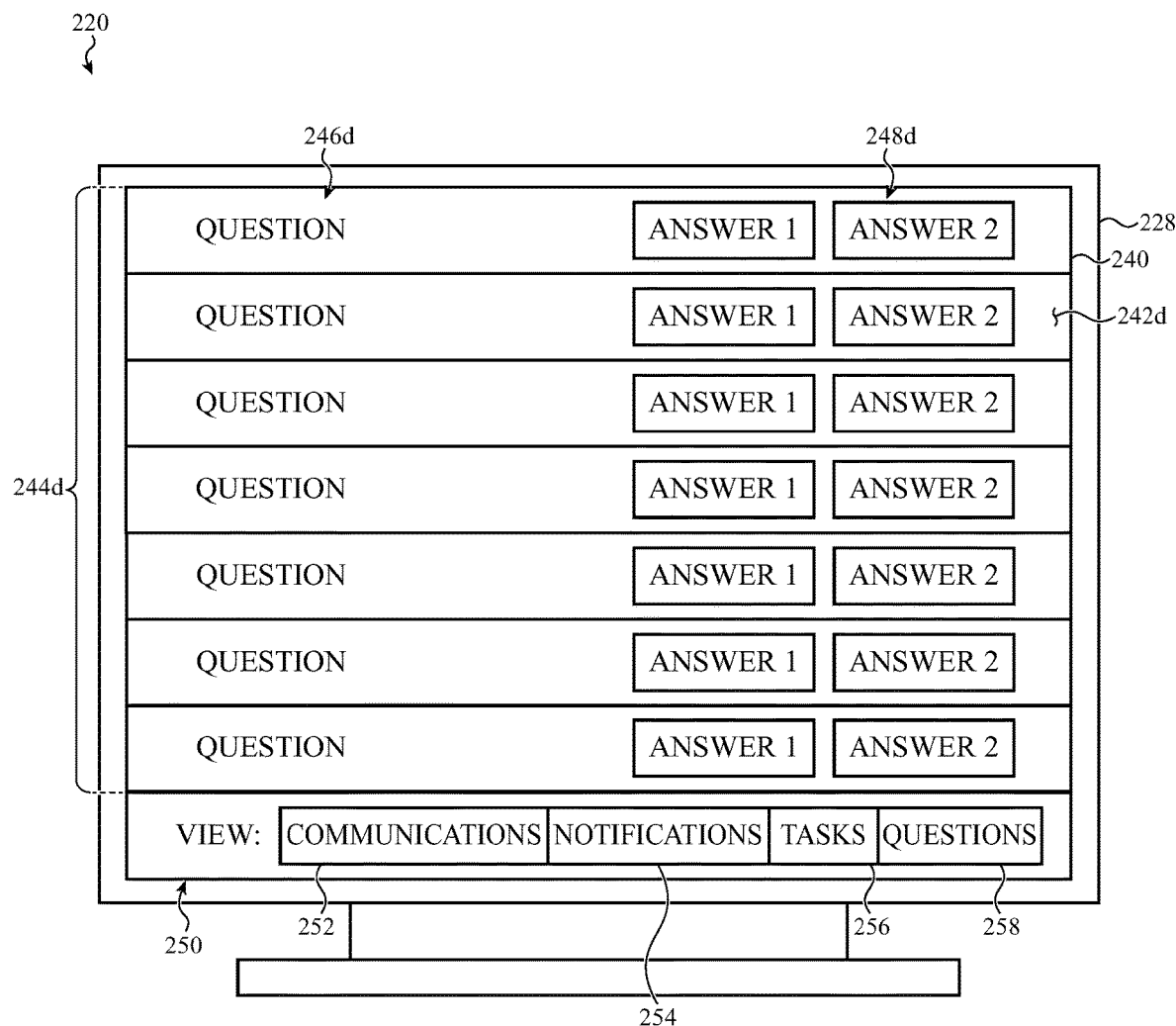

In FIG. 2D, the questions button 258 is selected, and a group of messages that are classified as questions is displayed in a graphical user interface 242d. The graphical user interface 242d can present a question list 244d that includes messages that are classified as questions. The question list 244d can display condensed information about messages that are classified as questions. The question list 244d may include elements 246d for each message. The element 246d may be or include text or other data extracted from the message (e.g., from an email header, subject, or body). For example, the element 246d may include information suitable for presenting a question and/or one or more answers to a user. In some cases, this may include processing an email made from a template (e.g., a form email or standardized email) to extract information that is unique (e.g., information that is not contained in the template). As noted above, the information extracted from messages for display using the elements 246d may be different information and/or may be formatted or otherwise presented differently than the information extracted from messages for display using the elements 246a, 246b, 246c of the graphical user interfaces 242a, 242b, 242c, respectively.

The actionable buttons 248d can be leveraged by the user to instruct the client application to perform one or more actions, including providing an answer to a question, and the like. In some cases, if a user selects an actionable button 248d to provide an answer to a question, the client application automatically composes and sends a message with the answer to the user. In some cases, the client application may provide answers directly to another application, such as a collaboration tool. The graphical user interface 242d may include the view selector 250. Messages may be classified as questions if the message asks the user a question. Answers provided in the graphical user interface 242d may be included in the message or they may be generated by the client application as possible responses to the question in the message.

These foregoing embodiments depicted in FIGS. 2A-2D and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings. For example, one or more graphical user interfaces may be capable of displaying messages classified in multiple groups. As one example, tasks and notifications may be provided in a single graphical user interface.

Figure 3:
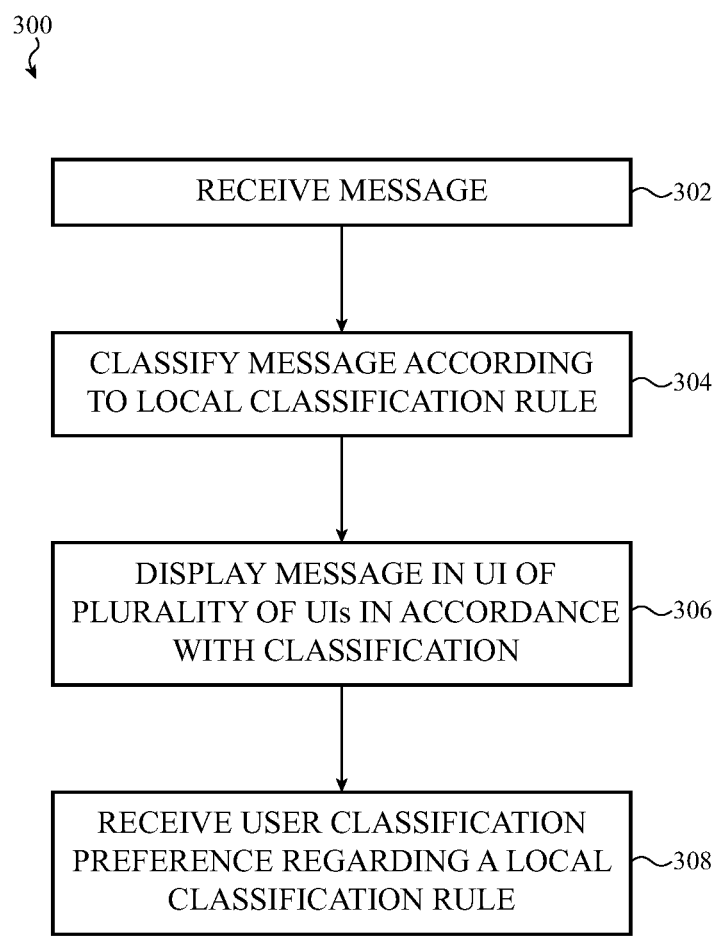
FIG. 3 is a flowchart depicting example operations of a method for classifying a message as described herein.

FIG. 3 is a flowchart depicting example operations of a method 300 for classifying a message as described herein. The method 300 can be performed in whole or in part by an instance of a client application executing on a client device. In particular, the method 300 can be performed by one or more hardware resources of that client device, such as a processor and/or a memory. In particular implementations, a processor of the client device can be configured to access a working and/or persistent memory to obtain executable instructions or binary files that, when executed by the processor, instantiate at least a portion of the client application. The client application may be a messaging application that is configured to send and receive messages. As an example, the client application may be an email client application, such as described above, that is configured to receive email and send email.

At operation 302, the client application receives a message. The message may be an email message that is received by the client application from an email server, such as the messaging server 110 discussed with respect to FIG. 1. At operation 304, the client application classifies the message according to a classification rule of a set of local classification rules. Messages may be classified based on message characteristics, including a sender of the message, one or more recipients of the message, content of the message, including a message subject and/or message body, message identifiers, such as header information. The instance of the messaging application operating on the client device 120a may analyze incoming messages to determine whether the message characteristics trigger the application of one or more classification rules. Classifying messages may include assigning the messages to different groups that are displayed in different user interfaces. Classifying messages may further include performing any operations related to the messages, moving, saving, or deleting the messages, automatically forwarding or replying to messages, determining a notification type for the messages, and the like. Messages may also be classified such that they are not displayed in any of the graphical user interfaces rendered by the client application.

At operation 306, the client application causes the message to be displayed in a graphical user interface of a plurality of graphical user interfaces in accordance with the classification. The graphical user interfaces rendered by the client application may present the messages in each group in a manner that is appropriate for the group. The client application may extract relevant information from the messages to present in the graphical user interface. For example, for messages classified as communications, the client application may extract a sender and/or a subject from a message for display in the graphical user interface. As another example, for a message classified as a question, the client application may extract a question and/or one or more answers from the message for display in the graphical user interface.

At operation 308, the client application receives a user classification preference regarding the classification rule. Providing a user classification preference may include enabling the classification rule so that the rule is applied to further messages received by the client application and/or disabling the classification rule so that it is not applied to further messages received by the client application. Providing the user classification preference may additionally or alternatively include editing the classification rule. Editing the classification rule may include changing which message characteristics are triggers for the classification rule and/or changing how messages to which the rule is applied are classified. For example, editing a classification rule may include changing one or more senders that trigger the rule's application and/or changing the rule to classify a message in a different group (e.g., a notification instead of a task).

Figure 4:
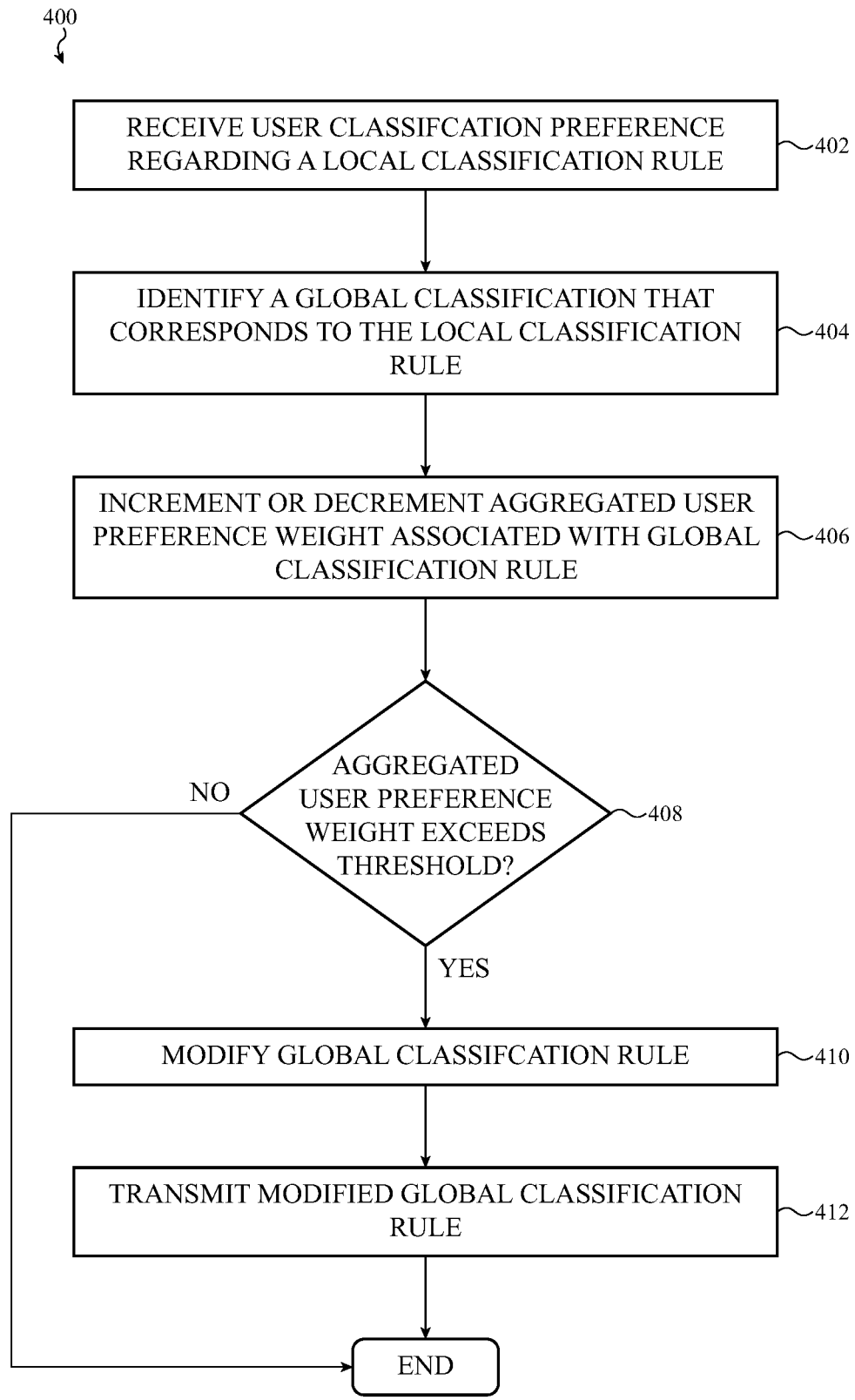
FIG. 4 is a flowchart depicting example operations of a method for updating a dynamic rules ledger and modifying a global classification rule based on a received user classification preference.

The client application may provide the user classification preference to a centralized classification service (e.g., the centralized classification service 114 discussed with respect to FIG. 1). The centralized classifications service may use the user classification preference to update a dynamic rules ledger and/or modify a global classification rule associated with the classification rule on the client device. FIG. 4 is a flowchart depicting example operations of a method 400 for updating a dynamic rules ledger and modifying a global classification rule based on a received user classification preference. The method 400 can be performed in whole or in part by a centralized classification service and/or any suitable hardware or software combination, such as described above with reference to FIG. 3.

At operation 402, the centralized classification service receives a user classification preference regarding a local classification rule. The user classification preference may be received from a client application operating on a client device that is configured to apply a set of local classification rules to messages received by the client application. As noted above, the user classification preference may be provided to the client application by a user enabling the classification rule so that the rule is applied to further messages received by the client application and/or disabling the classification rule so that it is not applied to further messages received by the client application. The user classification preference may additionally or alternatively be provided by a user editing the classification rule.

At operation 404, the centralized classification service identifies a global classification rule that corresponds to the local classification rule. As noted above, one or more local classification rules on a set of client devices has a corresponding global classification rule maintained by the centralized classification service. A single global classification rule maintained by the centralized classification service may correspond to multiple identical local classification rules on multiple client devices. In this way, user classification preferences provided for the identical local classification rules may be aggregated by the centralized classification service. As noted above, the dynamic rules ledger maintained by the centralized classification service may include one or more aggregated user preference weights for each global classification rule that represents the aggregated user classification preferences associated with the global classification rule. As noted above, the aggregated user preference weights may include an enable count, a disable count, an absolute count, a cycle count, and/or an edit count.

At operation 406, the centralized classification service increments or decrements an aggregated user preference weight associated with the identified global classification rule based on the received user classification preference. For example, if the user classification preference is the user enabling the classification rule, an enable count and/or an absolute count may be incremented. Similarly, if the user classification preference is the user disabling the classification rule, a disable count may be incremented and/or an absolute count may be decremented. Similarly, if the user classification preference is the user editing a classification rule, an edit count associated with the edit may be incremented.

At operation 408, the centralized classification service determines whether the aggregated user preference weight for the identified global classification rule meets or exceeds a threshold. If the aggregated user preference weight for the identified global classification rule meets or exceeds the threshold, the method 400 proceeds to operation 410. If the aggregated user preference weight for the identified global classification rule meets or exceeds the threshold, the method 400 ends, and the centralized classification service may wait to receive further user classification preferences.

At operation 410, the centralized classification service modifies the global classification rule. Modifying the global classification rule may include changing a state of the global classification rule and/or editing the global classification rule. The state of a global classification rule may be changed from inactive to active if the enable count meets or exceeds an active state threshold value (e.g., 5). The state of a global classification rule may be changed from active to inactive if the disable count meets or exceeds an inactive state threshold value (e.g., 3). The state of a global classification rule may be changed to recommended if the cycle count meets or exceeds a recommendation threshold value (e.g., 4). The threshold values may differ from one another. In some cases, the enable count and the disable count reset to zero each time the state of the global classification rule changes. If an edit count meets or exceeds an edit threshold, the global classification rule may be edited to reflect the change associated with the edit count.

Editing the global classification rule may include changing which message characteristics trigger the rule's application. Editing the global classification rule may additionally or alternatively include changing the group or groups to which messages classified by the rule are assigned.

At operation 412, the centralized classification service transmits the modified global classification rule to one or more client devices. The modified global classification rule may be incorporated into a set of local classification rules at the one or more client devices. In some cases, the modified global classification rule is transmitted to one or more client devices if the state changes from inactive to active, from inactive to recommended, or from recommended to active. In some cases, the modified global classification rule is included in a set of default classification rules for use during a setup operation. In some cases, the modified global classification rule is transmitted to one or more client devices in response to being edited by the centralized classification service. In some cases, a modified global classification rule is not transmitted to any client devices. For example, if a state of the classification rule changes from active to inactive, it may be removed from a set of default classification rules. In some cases, transmitting the modified global classification rule to a client device causes a state of the corresponding local classification rule to change. A global classification rule that is modified by changing a state of the rule may be transmitted to a client device to cause a corresponding change in state to the corresponding local classification rule.

Figure 5:
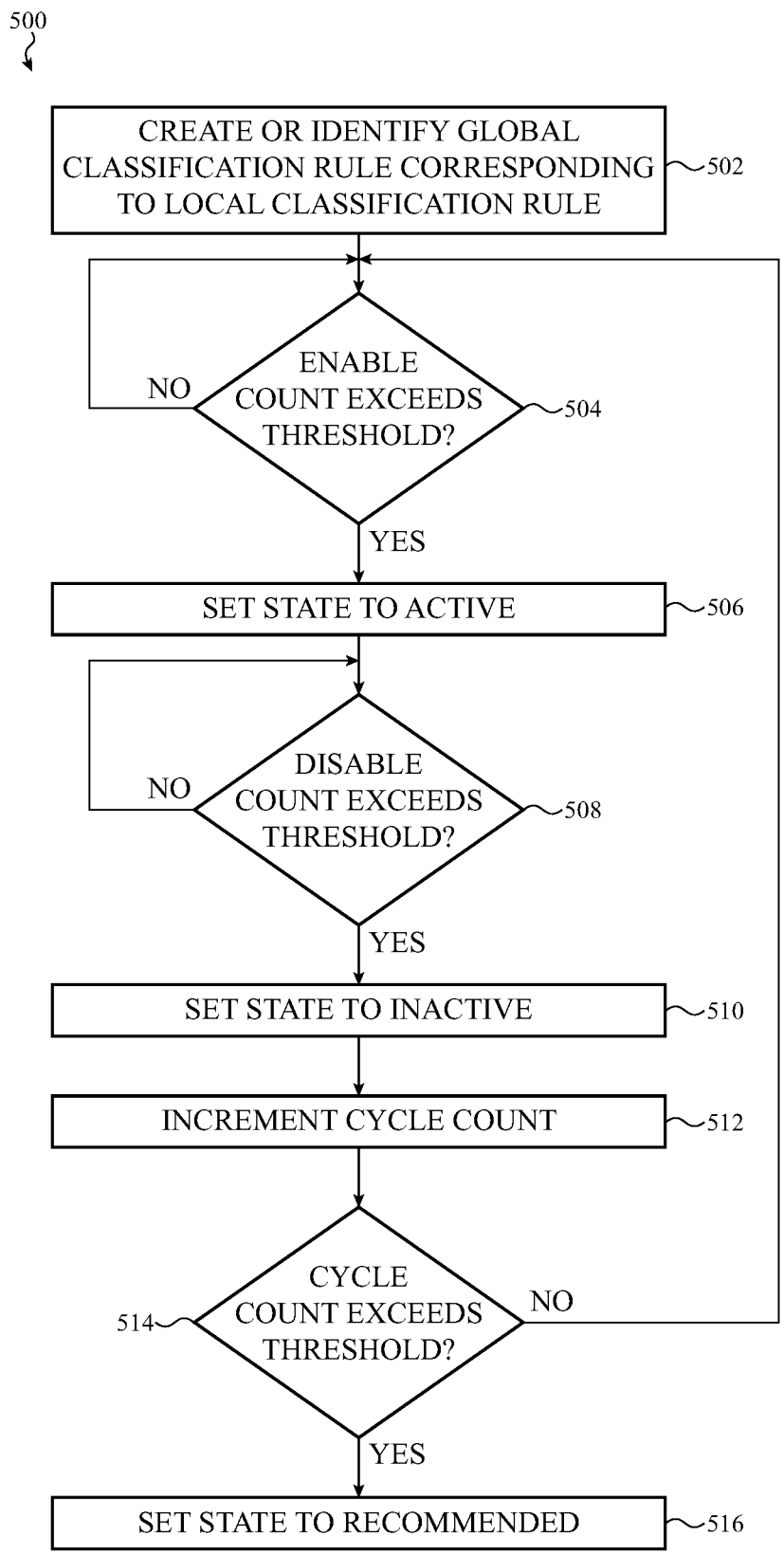
FIG. 5 is a flowchart depicting example operations of a method for establishing and changing a state of a global classification rule.

FIG. 5 is a flowchart depicting example operations of a method 500 for establishing and changing a state of a global classification rule. The method 500 can be performed in whole or in part by a centralized classification service and/or any suitable hardware or software combination, such as described above with reference to FIG. 3.

At operation 502, the centralized classification service creates or identifies a global classification rule corresponding to a local classification rule of a client device. The centralized classification service may create or identify the global classification rule corresponding to the local classification rule in response to the local classification rule being created using a client application or otherwise being made available or known to the centralized classification service. The centralized classification service may determine whether there is already a global classification rule corresponding to the local classification rule. If so, the local classification rule may be associated with the existing global classification rule, for example in a dynamic rules ledger. If there is not already a global classification rule corresponding to the local classification rule, the centralized classification service may create the global classification rule and associate the global classification rule with the local classification rule.

In the embodiment described with respect to the method 500, a state of a new global classification rule may be initially set to inactive. If the global classification rule is not new, the method 500 may proceed to operation 510 if the global classification rule is in an active state.

At operation 504, the centralized classification service determines whether an enable count of the global classification rule meets or exceeds an active state threshold value. As noted above, the enable count may be incremented when user preference feedback indicates that a local classification rule corresponding to the global classification rule is enabled by a user. If the enable count meets or exceeds the active state threshold value, the method 500 proceeds to operation 506. If the enable count does not meet or exceed the active state threshold value, the centralized classification service may repeat operation 504.

At operation 506, the centralized classification service sets the state of the global classification rule to active in response to the enable count meeting or exceeding the active state threshold value. In some cases, the enable count and/or the disable count of the global classification rule may be reset to zero in response to the status of the global classification rule changing.

At operation 508, the centralized classification service determines whether a disable count of the global classification rule exceeds an inactive state threshold value. As noted above, the disable count may be incremented when user preference feedback indicates that a local classification rule corresponding to the global classification rule is disabled by a user. If the disable count meets or exceeds the inactive state threshold value, the method 500 proceeds to operation 510. If the disable count does not meet or exceed the inactive state threshold value, the centralized classification service may repeat operation 508.

At operation 510, the centralized classification service sets the state of the global classification rule to inactive in response to the disable count meeting or exceeding the inactive state threshold value. In some cases, in response to the global classification rule being set to the inactive state, the global classification rule may be removed from a set of default classification rules. At operation 512, the centralized classification service increments a cycle count of the global classification rule. As noted above, in some cases the cycle count is incremented each time the classification rule completes a cycle of being enabled a predetermined number of times (e.g., 5 times) and disabled a predetermined number of times (e.g., 3 times). In some cases, the cycle count may be incremented each time the classification rule completes a cycle from the inactive state to the active state and back to the inactive state, or from the active state to the inactive state and back to the active state. In some cases, the cycle count may be incremented each time the classification rule transitions from the active state to the inactive state, or vice versa.

At operation 514, the centralized classification service determines whether the cycle count of the global classification rule exceeds a recommendation threshold value. If the cycle count meets or exceeds the recommendation threshold value, the method 500 proceeds to operation 516. If the cycle count does not meet or exceed the recommendation threshold value, the method 500 returns to operation 504.

At operation 516, the centralized classification service sets the state of the global classification rule to recommended. In some cases, once the state of a global classification rule is set to recommended, it maintains that state indefinitely. In some cases, upon the state of the global classification rule being set to recommended, the method 500 returns to operation 504 or 508.

Figure 6:
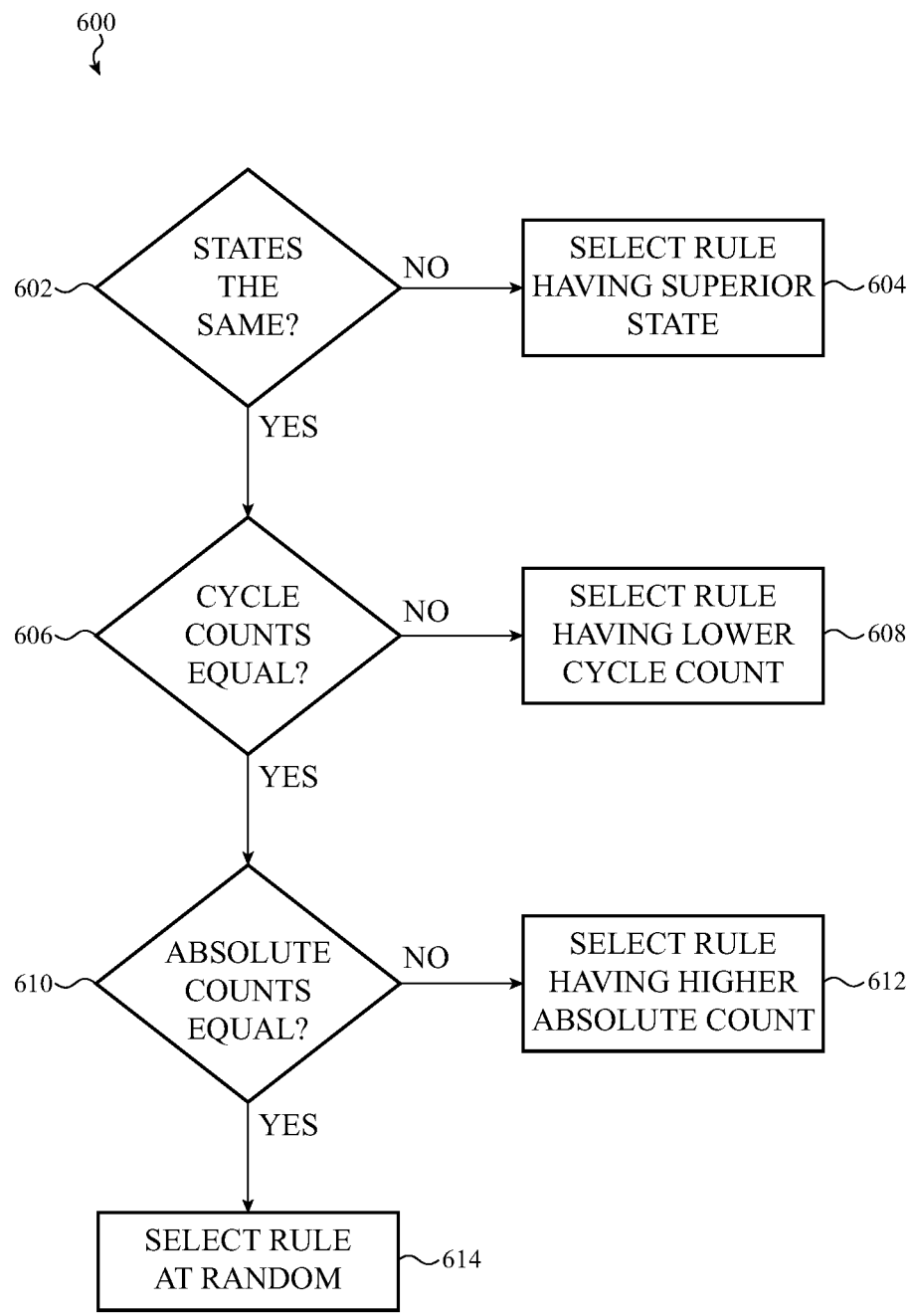
FIG. 6 is a flowchart depicting example operations of a method for choosing between conflicting classification rules.

As noted above, in some cases, global classification rules may conflict with one another. Different users may have different local classification rules that classify messages having particular message characteristics differently. A centralized classification service (e.g., centralized classification service 114) may choose between multiple conflicting rules by comparing the states of the classification rules and other properties of the classification rules, including aggregated user preference weights. The centralized classification service may choose between conflicting rules to select which classification rules to send to clients and/or which classification rules to include in a set of default classification rules. FIG. 6 is a flowchart depicting example operations of a method 600 for choosing between conflicting classification rules. The method 600 can be performed in whole or in part by a centralized classification service and/or any suitable hardware or software combination, such as described above with reference to FIG. 3.

At operation 602, the centralized classification service compares states of the conflicting classification rules. If the states are different, the method 600 proceeds to operation 604, in which the centralized classification service selects the classification rule having a superior state (e.g., a classification rule having an active state over a classification rule having a recommended or inactive state, a classification rule having a recommended state over an inactive state, etc.). If the states are the same, the method 600 proceeds to operation 606.

At operation 606, the centralized classification service compares cycle counts of the conflicting classification rules. If the cycle counts are different, the method 600 proceeds to operation 608, in which the centralized classification service selects the classification rule having the smaller cycle count. If the cycle counts are the same, the method 600 proceeds to operation 610.

At operation 610, the centralized classification service compares absolute counts of the conflicting classification rules. If the absolute counts are different, the method 600 proceeds to operation 612, in which the centralized classification service selects the classification rule having the greater absolute count. If the absolute counts are the same, the method 600 proceeds to operation 614, at which the centralized classification service selects a classification rule at random.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

Example computing resources or appliances that may be configured to receive email and/or send email (or send and/or receive other messages) as described herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

The foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

What is claimed is:

1. An email communication system, comprising:
a first client device of a set of client devices, the first client device comprising a first processor operably coupled to a first memory, the first memory storing instructions, which, when executed by the first processor, cause the first client device to operate a first client application; and
at least one server comprising a second processor operably coupled with a second memory, the second memory storing instructions, which, when executed by the second processor, cause the at least one server to provide a centralized classification service for aggregating user classification preferences across the set of client devices;
the first client application configured to:
  receive an email message;
  classify the email message in accordance with a local classification rule of a first set of local classification rules on the first client device, classifying the email message comprising assigning the email message to a group of a set of groups, each group of the set of groups comprising a respective set of email messages received by the first client device;
  cause the email message to be displayed in a graphical user interface;
  receive a user classification preference with respect to the local classification rule; and
  transmit the user classification preference to the centralized classification service; and
the centralized classification service configured to:
  receive the user classification preference from the first client device;
  identify a global classification rule of a set of global classification rules stored by the centralized classification service, the global classification rule corresponding to the local classification rule;
  update a state of the global classification rule based on the user classification preference received from the first client device;

in response to the state of the global classification rule changing from a first state to a second state, increment a cycle count associated with the global classification rule, the cycle count indicating a number of times the rule has changed from a current state to a new state;

in response to the cycle count exceeding a recommendation threshold value, change the state of the global classification rule to a recommended state, wherein changing the state of the global classification rule to the recommended state at least temporarily inhibits an automatic change in state of the global classification rule;

in response to the state of the global classification rule being updated to the recommended state, cause display in the graphical user interface of the first client device an option to elect whether the local state corresponding to the global classification rule of the first set of local classification rules for the first client device be updated as the active state or the inactive state.

2. The email communication system of claim 1, wherein:
the group is a first group;
modifying the global classification rule comprises changing the group to which email messages classified by the global classification rule are assigned from the first group to a second group of the set of groups; and
each respective set of email messages of each group of the set of groups is configured to be displayed in a separate graphical user interface of the plurality of graphical user interfaces.

3. The email communication system of claim 1, wherein:
the group is a first group;
modifying the global classification rule comprises changing the group to which email messages classified by the global classification rule are assigned from the first group to a second group of the set of groups; and
the respective set of email messages of the second group are not displayed in the graphical user interface of the plurality of graphical user interfaces.

4. The email communication system of claim 1, wherein the user classification preference comprises a request by a user of the first client device to enable or disable the local classification rule.

5. The email communication system of claim 1, wherein:
the centralized classification service is configured to:
increment or decrement an aggregated user preference weight associated with the global classification rule based on the user classification preference; and
in response to the aggregated user preference weight satisfying a predetermined threshold, modifying the classification rule;
the user classification preference comprises a request to enable the local classification rule on the first client device;
the aggregated user preference weight is an enable count;
incrementing or decrementing the aggregated user preference weight comprises incrementing the enable count; and
modifying the global classification rule comprises changing a state of the global classification rule to active.

6. The email communication system of claim 1, wherein:
the centralized classification service is configured to:
increment or decrement an aggregated user preference weight associated with the global classification rule based on the user classification preference; and in response to the aggregated user preference weight satisfying a predetermined threshold, modifying the classification rule
the user classification preference comprises a request to disable the local classification rule on the first client device;
the aggregated user preference weight is a disable count;
incrementing or decrementing the aggregated user preference weight comprises incrementing the disable count; and
modifying the global classification rule comprises changing a state of the global classification rule to inactive.

7. The email communication system of claim 6, wherein the centralized classification service is further configured to:
increment the cycle count in response the state of the global classification rule changing from inactive to active and from active to inactive.

8. The email communication system of claim 1, wherein:
the centralized classification service is further configured to:
determine a set of default global classification rules; and
transmit the set of default global classification rules to the second client device during a setup operation.

9. The email communication system of claim 8, wherein:
determining the set of default global classification rules comprises choosing between a first global classification rule and a second global classification rule that conflicts with the first global classification rule; and
choosing between the first global classification rule and the second global classification rule comprises comparing a first aggregated user preference weight associated with the first global classification rule to a second aggregated user preference weight associated with the second global classification rule.

10. The email communication system of claim 1, wherein:
a second client device is configured to:
receive the modified classification rule;
determine whether the modified classification rule conflicts with one or more local classification rules of the second set of local classification rules on the second client device; and
in response to the modified classification rule not conflicting with the one or more local classification rules of the second set of local classification rules, incorporate the modified classification rule into the second set of local classification rules.

11. A computer-implemented method for aggregating user classification preferences for an email system, the method comprising:
receiving a user classification preference from a first client device regarding a local classification rule of a first set of local classification rules for classifying messages received by a client application executing on the first client device;
identifying a global classification rule of a set of global classification rules, the global classification rule corresponding to the local classification rule;
updating a state of the global classification rule based on the user classification preference received from the first client device;
in accordance with the state of the global classification rule being updated to an active state, causing a state corresponding to a respective local classification rule of a second set of local classification rules for a second client device to be updated as the active state, the respective local classification rule of the second set of local classification rules corresponding to the global classification rule;

in accordance with the state of the global classification rule being updated to an inactive state, incrementing a cycle count associated with the global classification rule, the cycle count indicating a number of times the rule has changed from a current state to a new state;

in response to the cycle count exceeding a recommendation threshold value, changing the state of the global classification rule to a recommended state, wherein changing the state of the global classification rule to the recommended state at least temporarily inhibits an automatic change in state of the global classification rule;

in accordance with the state of the global classification rule being updated to a recommended state:

causing display on a graphical user interface of the second client device an option to elect whether a local state corresponding to the respective local classification rule of the second set of local classification rules be updated as the active state or the inactive state; and transmitting the second set of classification rules for the second client device to the second client device.

12. The method of claim 11, wherein:

the global classification rule is a first global classification rule; and the method further comprising:

choosing between the first global classification rule and a second global classification rule that conflicts with the first global classification rule by comparing a first state of the first global classification rule to a second state of the second global classification rule.

13. The method of claim 12, wherein choosing between the first global classification rule and the second global classification rule further comprises comparing a first aggregated user preference weight associated with the first global classification rule to a second aggregated user preference weight associated with the second global classification rule.

14. An email communication system, comprising:

a first client device of a set of client devices, the first client device comprising a first processor operably coupled to a first memory, the first memory storing instructions, which, when executed by the first processor cause the first client device to operate a client application;

at least one server comprising a second processor operably coupled to a second memory, the second memory storing instructions, which, when executed by the second processor cause the at least one server to provide a centralized classification service;

the client application configured to:

receive an email message;

classify the email message in accordance with a local classification rule of a first set of local classification rules;

receive a request to disable the local classification rule on the first client device; and transmit a user classification preference indicating the request to disable the local classification rule to the at least one server executing the centralized classification service; and the centralized classification service is configured to:

receive the user classification preference from the first client device;

identify a global classification rule of a set of global classification rules stored by the centralized classification service, the global classification rule corresponding to the local classification rule;

increment a disable count associated with the global classification rule in response to the user classification preference indicating the request to disable the local classification rule;

in response to the disable count exceeding an inactive state threshold value, change a respective state of the global classification rule from a current state to an inactive state;

in response to the state of the global classification rule changing from the current state to the inactive state, increment a cycle count associated with the global classification rule, the cycle count indicating a number of times the rule has changed from a current state to a new state;

in response to the cycle count exceeding a recommendation threshold value, change the state of the global classification rule to a recommended state, wherein changing the state of the global classification rule to the recommended state at least temporarily inhibits an automatic change in state of the global classification rule;

in response to updating the respective state of the global classification rule, transmit, to a second client device of the set of client devices, a set of default classification rules including the global classification rule and the respective state of the global classification rule; and in response to updating the respective state of the global classification rule to the recommended state, causing display on a graphical user interface of a second client device an option to elect whether a local state corresponding to a local classification rule of a second set of local classification rules for the second client device be updated as the active state or the inactive state.

15. The email communication system of claim 14, wherein:

the email message is a first email message;

the local classification rule is a first local classification rule; and the client application is further configured to:

receive a second email message; and classify the second email message in accordance with a second local classification rule of the first set of local classification rules.

16. The email communication system of claim 15, wherein:

classifying the first email message comprises assigning the first email message to a first group comprising a first set of email messages received by the first client device;

classifying the second email message comprises assigning the second email message to a second group comprising a second set of email messages received by the first client device; and the client application is further configured to:

cause the first email message to be displayed in a first graphical user interface of a plurality of graphical user interfaces along with the first set of email messages; and cause the second email message to be displayed in a second graphical user interface of the plurality of graphical user interfaces along with the second set of email messages.

17. The email communication system of claim 14, wherein the centralized classification service is further configured to decrement an absolute count associated with the global classification rule in response to the user classification preference indicating the request to disable the local classification rule.

18. The email communication system of claim 14, wherein the centralized classification service is further configured to:
- increment a cycle count in response to the user classification preference indicating the request to disable the local classification rule; and
- in response to the cycle count exceeding a recommendation threshold value, change the respective state of the global classification rule to the recommended state.

* * * * *